US008767662B1

United States Patent
Park et al.

(10) Patent No.: US 8,767,662 B1
(45) Date of Patent: Jul. 1, 2014

(54) MANAGING ALLOCATION OF CONTROL CHANNEL RESOURCES

(75) Inventors: Sungki Park, Ashburn, VA (US); Brent A. Scott, Leeton, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 114 days.

(21) Appl. No.: 13/534,354

(22) Filed: Jun. 27, 2012

(51) Int. Cl.
*H04W 4/00* (2009.01)

(52) U.S. Cl.
USPC .......................................................... 370/329

(58) Field of Classification Search
USPC ................................................. 370/328–338
See application file for complete search history.

(56) References Cited

U.S. PATENT DOCUMENTS

| 7,966,032 | B2 * | 6/2011 | Chi et al. ...................... 455/522 |
| 2010/0157922 | A1 | 6/2010 | Kim et al. |
| 2012/0054258 | A1 | 3/2012 | Li et al. |
| 2012/0224552 | A1 * | 9/2012 | Feuersanger et al. ......... 370/329 |
| 2013/0070611 | A1 * | 3/2013 | Ahn et al. ..................... 370/241 |
| 2013/0070716 | A1 * | 3/2013 | Kwon et al. .................. 370/329 |
| 2013/0089062 | A1 * | 4/2013 | Ahn et al. ..................... 370/329 |
| 2013/0095748 | A1 * | 4/2013 | Hu et al. ........................... 455/8 |

* cited by examiner

*Primary Examiner* — Anh-Vu Ly
*Assistant Examiner* — Deepa Belur (57) ABSTRACT

A method and system for allocating control channel resources. After initially allocating control channel elements to user equipment (UE), a processing unit may engage in a modification process in an effort to optimize the allocation, which may involve changing a number of control channel elements, taking into account transmission power headroom and predicted error rate.

20 Claims, 9 Drawing Sheets

MANAGING ALLOCATION OF CONTROL CHANNEL RESOURCES

BACKGROUND

Unless otherwise indicated herein, the materials described in this section are not prior art to the claims and are not admitted to be prior art by inclusion in this section.

In a cellular wireless communication system, the downlink air interface from each base station typically has limited capacity to carry signaling information, such as general system information and user-specific information such as paging messages and the like. For example, in a system where the air interface is time division multiplexed, only certain periodically recurring time segments may be available to carry signaling information. Further, in a system where the air interface is frequency division multiplexed, only certain subcarriers may be available to carry signaling information, perhaps also on a periodically recurring time basis.

In such systems, an issue may be how to allocate the limited air interface signaling capacity for use to carry user-specific signaling information.

The Long Term Evolution (LTE) air interface is a good example of such a scenario. LTE employs orthogonal frequency division multiplexing (OFDM), where symbols are distributed on subcarriers across a defined bandwidth, such as 10 MHz for instance. Periodically over time, such as every 0.5 ms for example, each LTE base station ("eNodeB") may transmit control signaling that occupies defined resource elements (OFDM symbols) in up to three 67 µs time segments across the bandwidth.

Certain resource elements at each 0.5 ms signaling period may be reserved for use to carry reference symbols that essentially define a pilot signal for user equipment (UE) to monitor coverage. Still other resource elements may be reserved to define a physical control format indicator channel (PCFICH), which carries signaling overhead information such as an indication of how many 67 µs time segments are being used for control signaling. Remaining resource elements may then be used to carry one or more physical downlink control channels (PDCCH), each carrying downlink control information (DCI) including air interface resource assignments and other control information for one or more particular UEs.

In LTE as currently defined by way of example, each PDCCH provides UE-specific control information within a number of control channel elements (CCE), each of which is provided as nine resource element groups (REG), with each REG being four resource elements, mapping four quadrature phase shift keying (QPSK) symbols, for a total of 36 QPSK symbols per CCE. The CCEs are numbered with identifiers, and the base station may allocate particular CCEs to particular UEs by specifying the allocations in the PCFICH, with reference to CCE IDs and UE IDs.

Overview

In practice, an LTE base station may have an option to convey signaling information to a particular UE in a number n of CCEs at a time, where n can be 1, 2, 4, or 8 (under current LTE design), defined by a PDCCH format that is a power of 2 (i.e., 0, 1, 2, or 3). As a general matter, if a UE's channel conditions are particularly good, such as where the UE is close to the base station, the base station may use a low PDCCH format, as the UE-specific signaling information can be successfully transmitted to the UE in perhaps one CCE while maintaining an acceptable error level (operating point). On the other hand, if a UE's channel conditions are relatively poor, such as where the UE is near the cell edge, the base station may use a high PDCCH format and may spread the signaling information across multiple CCEs, with repetition of bits within individual CCEs, to help improve the chances of successful receipt by the UE.

Furthermore, the base station may be able to vary the power level at which it transmits each CCE to a UE, based on the UE's channel conditions. For instance, if the UE channel conditions are particularly good, the base station may be able to transmit a CCE to the UE at a relatively low power level while still maintaining a desired error level. On the other hand, if the UE channel conditions are poor, the base station may transmit a CCE to the UE at a relatively high power level in order to maintain an operating point within a defined error tolerance.

Given the limited bandwidth for carrying signaling information in LTE, however, there are by definition a limited number of CCEs per signaling period.

Disclosed herein is a method and system for helping to intelligently allocate CCEs or other such signaling resources for control signaling to UEs. According to the disclosure, when a base station is seeking to allocate the CCEs of a given signaling period among UEs, the base station may initially make some heuristic allocations of the CCEs among the various UEs (e.g., random allocations, or allocations based on one or more considerations), and the base station may then modify one or more of the allocations in an effort to help optimize allocations among the UEs or for at least one UE, taking into consideration available transmission power and predicted error rate.

In one respect, for instance, disclosed is a method for managing air interface control channel resources for transmission of control signaling from a base station to a user device. The method may involve establishing for the transmission an initial resource allocation comprising a first number of CCEs and an associated first transmission power level, such that the transmission would have a predicted error rate within a defined error tolerance. In turn, the method may involve engaging in a modification process in an effort to help optimize the allocation, and the method may then involve engaging in the transmission in accordance with the allocation.

In practice, the modification process may involve making a first determination of whether the base station has sufficient transmission power headroom to engage in the transmission with a second number of CCEs fewer than the first number of CCEs and at an associated second transmission power level higher than the first transmission power level, while keeping the predicted error rate of the transmission of the transmission unchanged.

If the first determination is affirmative, then the method may involve responsively changing the allocation to comprise the second number of CCEs (instead of the first number of CCEs) and the second transmission power level (instead of the first transmission power level). On the other hand, if the first determination is negative, then the method may involve responsively making a second determination of whether the transmission with the second number of CCEs but at the first transmission power level would have a predicted error rate within the defined error tolerance. And if the second determination is affirmative, then the method may involve responsively changing the allocation to comprise the second number of CCEs (instead of the first number of CCEs). Whereas, if the second determination is negative, then the method may involve not changing the allocation to comprise the second number of CCEs (instead of the first number of CCEs).

Further, in another respect, disclosed is a base station for use in a wireless communication system. The base station may comprise an antenna structure for radiating to define an air interface, a power-amplifier, a processing unit, data storage, and resource-allocation logic stored in the data storage and executable by the processing unit to allocate air interface signaling capacity for transmission of control signaling to a user device.

In practice, as with the method discussed above, an initial allocation of the air interface signaling capacity for the transmission may comprise a first number of CCEs and an associated first transmission power level, for the transmission to have a predicted error rate within a defined error tolerance. In turn, execution of the resource-allocation logic by the processing unit may cause the processing unit to carry out various functions such as those described above and to then allocate the air interface signaling capacity in accordance with the allocation.

For instance, the processor may make a first determination of whether the base station has sufficient transmission power headroom to engage in the transmission with a second number of CCEs fewer than the first number of CCEs and at an associated second transmission power level higher than the first transmission power level, while keeping the predicted error rate of the transmission unchanged.

If the first determination is affirmative, then the processor may responsively change the allocation to comprise the second number of CCEs (instead of the first number of CCEs) and the second transmission power level (instead of the first transmission power level). On the other hand, if the first determination is negative, then the processor may make a second determination of whether the transmission with the second number of CCEs but at a transmission power level less than the second transmission power level would have a predicted error rate within the defined error tolerance. And if the second determination is affirmative, then the processor may responsively change the allocation to comprise the second number of CCEs (instead of the first number of CCEs). Whereas, if the second determination is negative, then the processor may forgo changing the allocation to comprise the second number of CCEs (instead of the first number of CCEs).

Still further, in another respect, disclosed is a non-transitory computer-readable medium having stored thereon instructions executable by a processing unit to cause a base station to carry out functions such as those noted above, to facilitate allocation of control channel resources.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

Referring to the drawings, as noted above, FIG. 1 is a simplified block diagram of a wireless communication system in which the present method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 1:
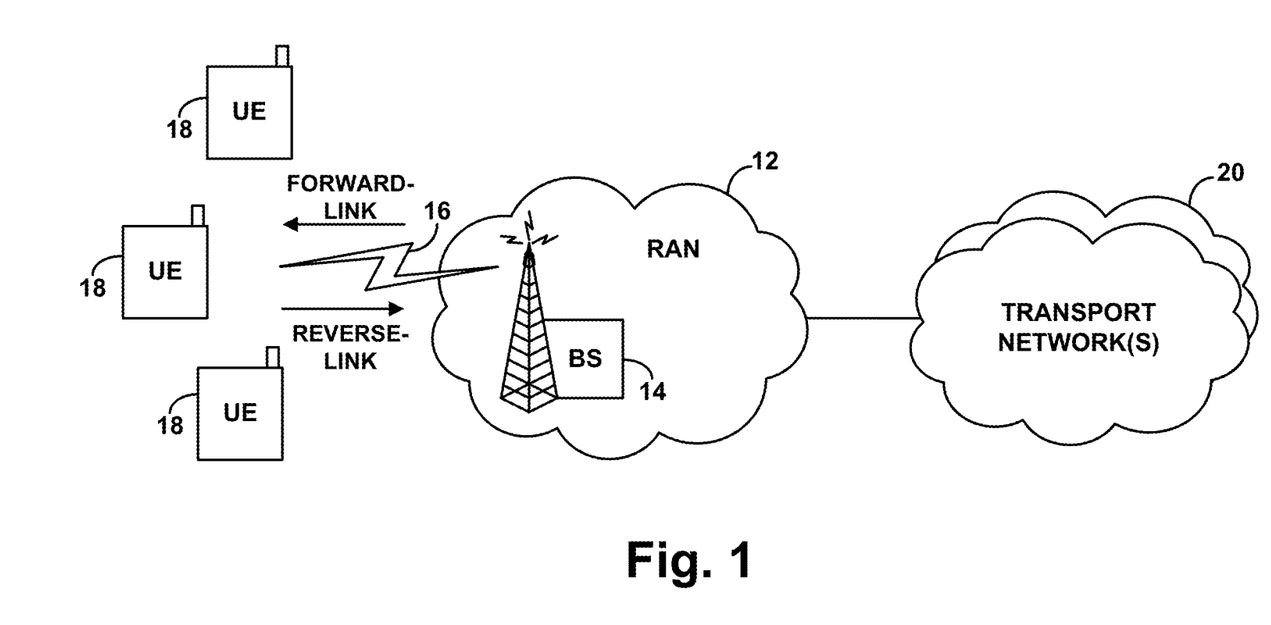
FIG. 1 is a simplified block diagram of a wireless communication system in which the present method can be implemented.

FIG. 1 depicts the example communication system as including at its core a radio access network (RAN) 12 having at least one base station 14 that radiates to define a wireless air interface 16 through which the base station may communicate with one or more served user devices (UEs) 18. RAN 12 then provides connectivity with one or more transport networks 20, such as the public switched telephone network (PSTN) or the Internet for instance. With this arrangement, a UE 18 that is positioned within coverage of the base station and that is suitably equipped may engage in air interface communication with the base station and may thereby communicate with remote entities on the transport network(s) and/or with other access terminals served by the RAN.

Figure 2:
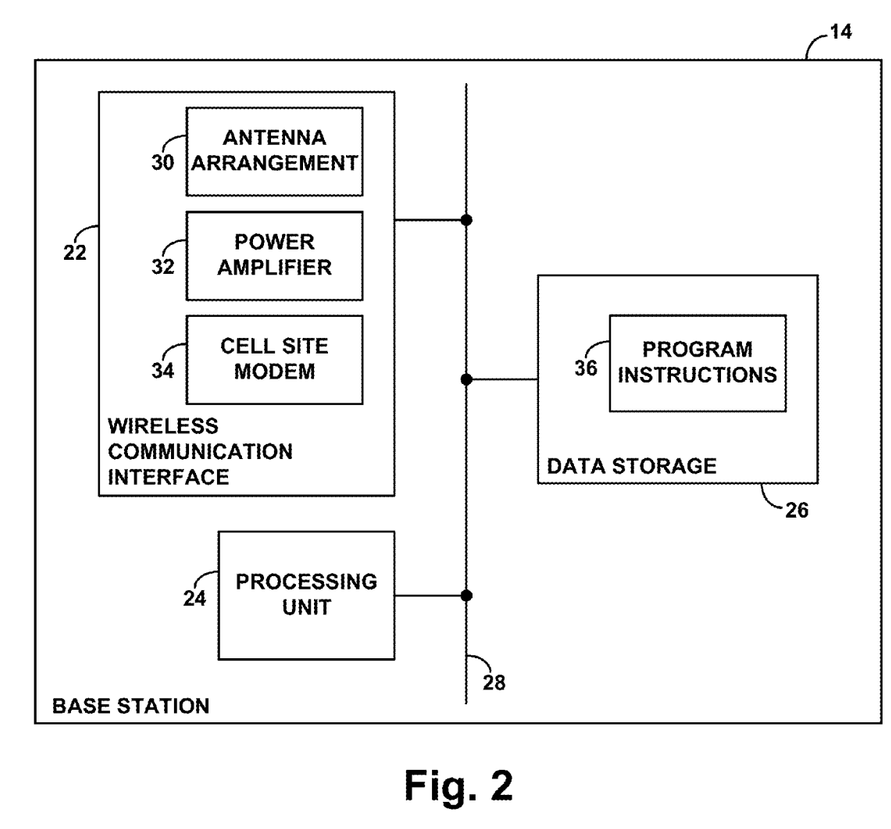
FIG. 2 is a simplified block diagram of a base station operable in the arrangement of FIG. 1.

FIG. 2 is next a simplified block diagram of a representative base station 14, such as a base transceiver station, access node, access point, Node-B, or eNodeB, for instance (whether macro, femto or the like), illustrating some of the components that can be included in such an entity. As shown in FIG. 2, the representative base station may include a wireless communication interface 22, a processing unit 24, and data storage 26, all of which may be coupled together by a system bus, network or other connection mechanism 28.

As shown, wireless communication interface 22 may comprise an antenna arrangement (i.e., antenna structure) 30, which may be tower mounted, and associated components such as a power amplifier 32 and a cell site modem 34 for engaging in air interface communication with UEs 18 via the antenna arrangement 30, so as to transmit data and control information to the UEs and receive data and control information from the UEs. In practice, the power amplifier 32 may have a maximum transmission power that the base station can use for transmission by across the downlink bandwidth at any given time, and the base station may allocate that power among various resource elements or resource element groups, such as among particular CCEs for instance.

Processing unit 24 may then comprise one or more general purpose processors (e.g., microprocessors) and/or special-purpose processors (e.g., digital signal processors and/or application specific integrated circuits) and may be integrated in whole or in part with the wireless communication interface. And data storage 26 may comprise one or more volatile and/or non-volatile storage components, such as magnetic, optical, flash, or other types of non-transitory computer readable media, and may be integrated in whole or in part with processing unit 24.

As shown, data storage 26 may hold (have encoded thereon) program instructions 36, which may be executable by processing unit 24 to carry out various base station or RAN functions described herein, and specifically to cause the base station to carry out such functions. For instance, in accordance with the program instructions, the processing unit may function to allocate CCEs, with suitable transmission power and modulation coding, for use to transmit control signaling to UEs. In particular, given a certain number of available CCEs across the downlink bandwidth and a certain extent of control signaling to transmit, such as a certain number of UEs to which control signaling is to be transmitted, the processing unit may first establish a heuristic (e.g., random or other) allocation of CCEs and may then engage in the process as noted above, to help optimize CCE allocation. Ultimately, the processing unit may then cause the base station to transmit control signaling in accordance with the established (preferably optimized) allocation.

As such, the processing unit 24 programmed with instructions 36 that may define part or all of a controller for controlling operation of the base station 14. Alternatively or additionally, however, such control functionality could be provided external to the base station 14, in another RAN entity such as by a RAN or base station control entity, which may be communicatively linked with the base station and may serve to control certain aspects of base station operation and/or RAN operation generally.

In practice, base station 14 may communicate with UEs 18 over the air interface 16 according to one or more agreed air interface protocols, examples of which include LTE, CDMA, WiMAX, IDEN, GSM, GPRS, UTMS, EDGE, MMDS, WIFI, BLUETOOTH, and other protocols now known or later developed. The principles of the present method may be applicable in various ones of these protocols. For simplicity, however, this description will focus specifically on implementation in LTE as described above.

Figure 3:
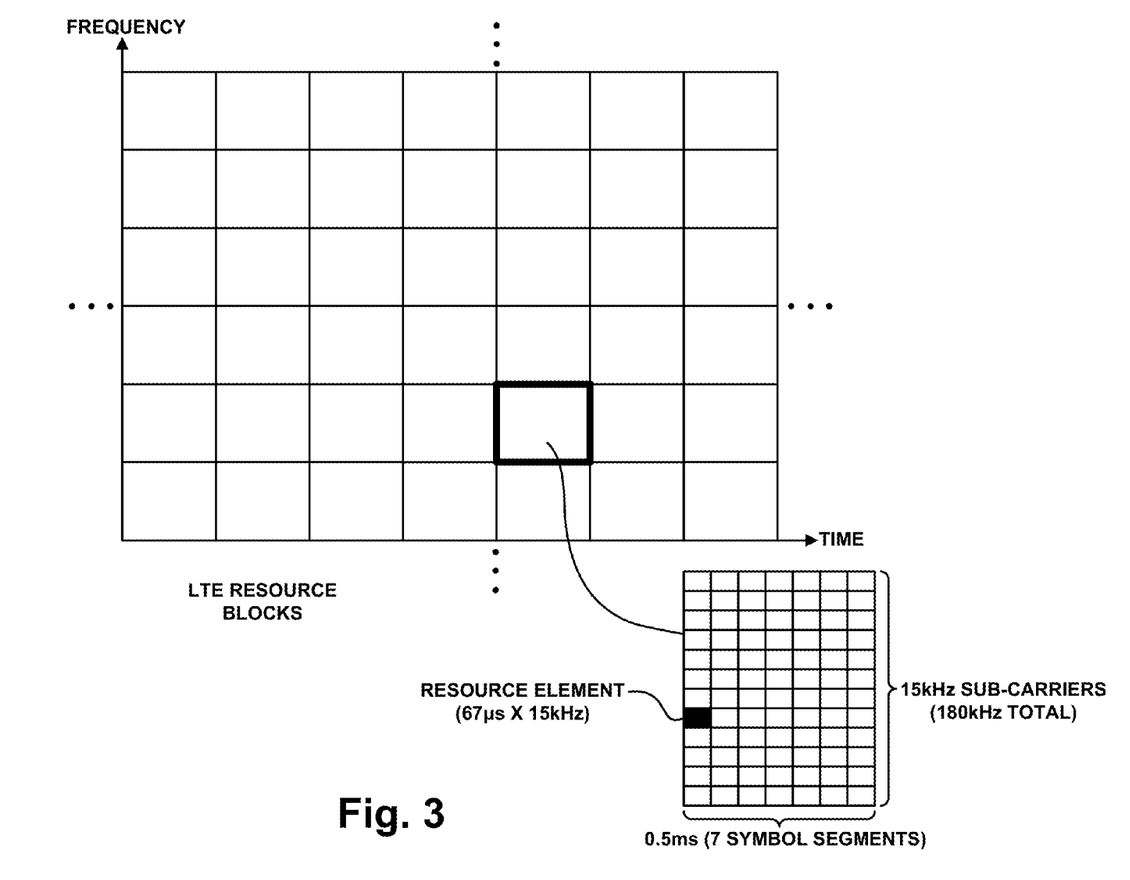
FIG. 3 is a depiction of a portion of a representative downlink interface in an example implementation.

FIG. 3 next depicts an example air interface arrangement according to LTE (as defined by the $3^{rd}$ Generation Partnership Project (3GPP) for instance). In LTE, the downlink may span a particular frequency bandwidth (such as 5 MHz, 10 MHz, or 20 MHz for instance) that is divided into sub-carriers of 15 kHz, and the forward-link may be divided over time into a sequence of 0.5 ms segments. In turn, every 0.5 millisecond segment may define a certain number of 12-subcarrier wide "resource blocks" across the frequency bandwidth (as many as would fit within the given frequency bandwidth). And each resource block may then be further divided over time into seven symbol segments of 67 μs each (with some guard time between each). Thus, across frequency and time, the LTE air interface is divided essentially into a grid of resource elements, each 67 μs by 15 kHz, and groups of those resource elements define resource blocks, each 0.5 ms by 180 kHz.

Figure 4:
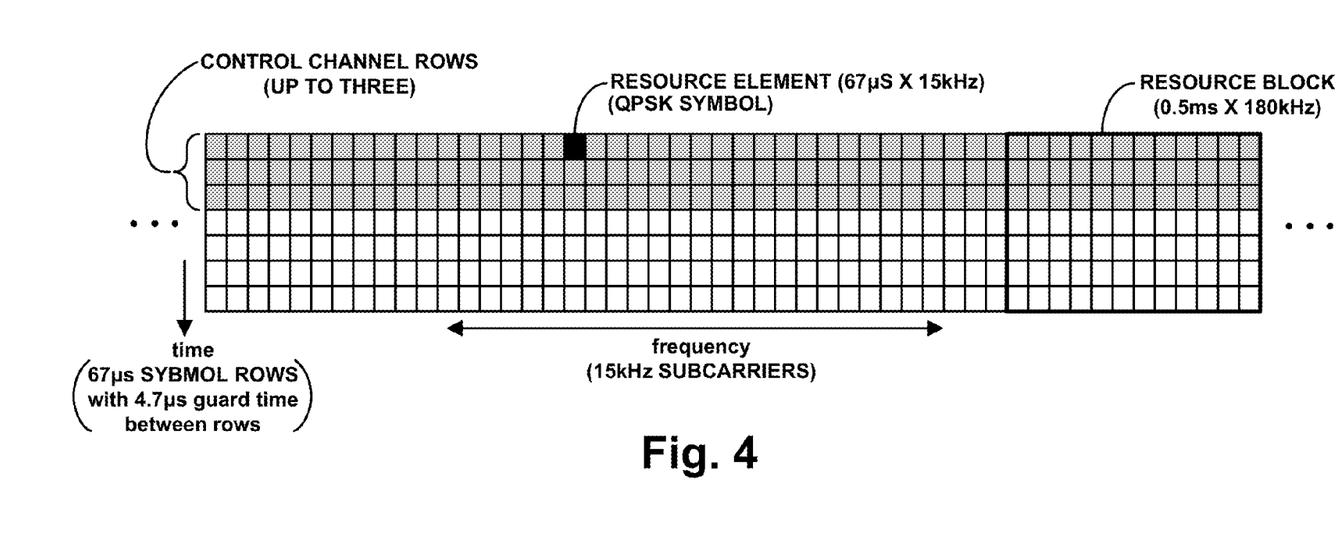
FIG. 4 is another depiction of a portion of a representative downlink interface in an example implementation.
Figure 5:
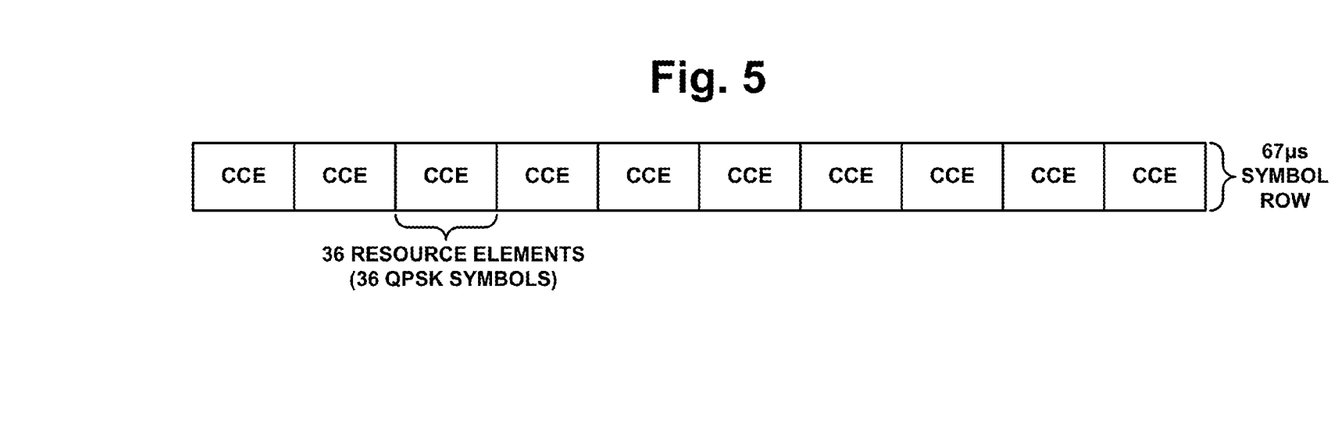
FIG. 5 is a depiction of control channel elements in the representative downlink of FIG. 4.

As shown next in FIG. 4, up to the first three symbol rows of every 0.5 ms time segment may be set aside to carry control signaling to UE devices. As noted above, some of the resource elements in the designated control channel row(s) may be used to define a PCFICH, which may indicate how many rows are used for control channel signaling, and remaining resource elements in the designated row(s) may then be used to carry UE-specific control signaling within CCEs. As further noted above, and as illustrated next by FIG. 5, each CCE may span 36 resource elements, i.e., 36 QPSK symbols.

As discussed above, CCEs may carry resource assignment information and other control information to UEs. In terms of resource assignment, in particular, CCEs may carry data that indicates to a given UE which resource blocks across the frequency bandwidth carry data destined to that UE. Upon successful receipt of such resource assignment information, a UE may thus determine which resource blocks carry data to the UE and may then read those resource blocks. It follows, however, that if a UE does not successfully receive such resource assignment information, the UE may not properly read the appropriate resource blocks, which may constitute a transmission error, namely a block error. In practice, the base station may detect and record such a transmission error when the base station does not receive an expected positive acknowledgement (ACK) from the UE, or when the base station receives a negative acknowledgement (NAK) from the UE. And in response, the base station may then repeat the process, re-transmitting the data to the UE.

In practice, when an LTE base station has signaling information to convey to a UE, the base station may take into account several variables to determine how to allocate air interface resources for that transmission. The three principle factors are (i) how many CCEs to use for the transmission, (ii) what power level to use for the transmission, and (iii) what the likely block error rate will be.

As noted above, for instance, the base station may have an option to convey signaling information to a given UE in 1, 2, 4, or 8 CCEs. In general, the fewer CCEs the base station uses for such a transmission, the more transmission power the base station may need to use for the transmission while maintaining an acceptable block error rate, since the signaling information would be spread across less signaling space, with less QPSK repetition within each CCE. On the other hand, the more of CCEs the base station uses for such a transmission, the less transmission power the base station may need to use to maintain acceptable block error rate, since the signaling information would be spread across more signaling space, with more QPSK repetition within each CCE.

Considering that the base station has limited transmission power (e.g., as defined by its power amplifier for instance), the base station may thus strive to use as many CCEs as possible for transmission of signaling information to individual UEs, to help minimize the power that the base station uses for those transmissions. However, given the finite frequency bandwidth on the air interface, the base station has a limited number of CCEs available for such transmission within a given segment of time (such as a given symbol-row for instance). The present method helps to balance these concerns.

Figure 6:
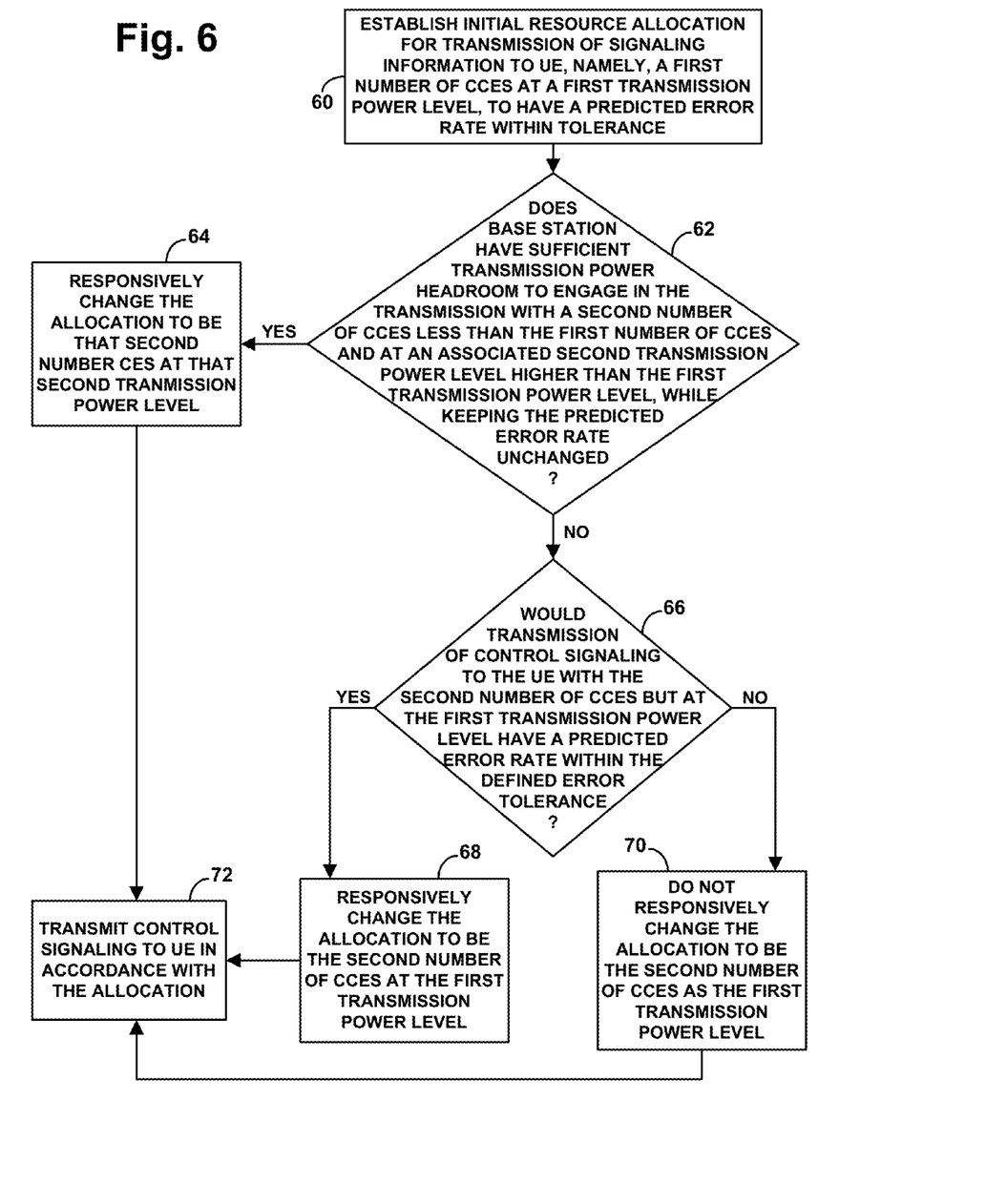
FIG. 6 is a flow chart depicting functions that can be carried out in accordance with an example implementation.

In operation, the method may be implemented by processing unit 24 of the base station, executing program instructions 36 to carry out functions such as those illustrated by the flow chart of FIG. 6, for transmission of control signaling to a particular UE. This may be part of a larger process of managing allocation of control channel resources generally across the air interface, and the base station may carry out this process on an ongoing basis.

As shown in FIG. 6, at block 60, the processing unit may first establish an initial resource allocation for the transmission of signaling information to the UE at issue, particularly an initial allocation of a first number of CCEs and an associated first transmission power level, for the transmission to have a predicted error rate within a defined error tolerance.

The processing unit may perform this initial allocation heuristically, such as by randomly assigning a particular number of CCEs and a particular power level for the transmission. Further, this initial allocation may be part of a larger initial allocation of CCEs and power for transmission of signaling information to multiple UEs at once (in a given symbol-row, for instance). Moreover, this initial allocation process may take into consideration the actual block error rates for transmissions to individual UEs. For instance, the processing unit may allocate a greater number of CCEs and/or greater transmission power to those UEs that have experienced high block error rates, and fewer CCEs and/or less transmission power to those that have experienced low block error rate.

Figure 7:
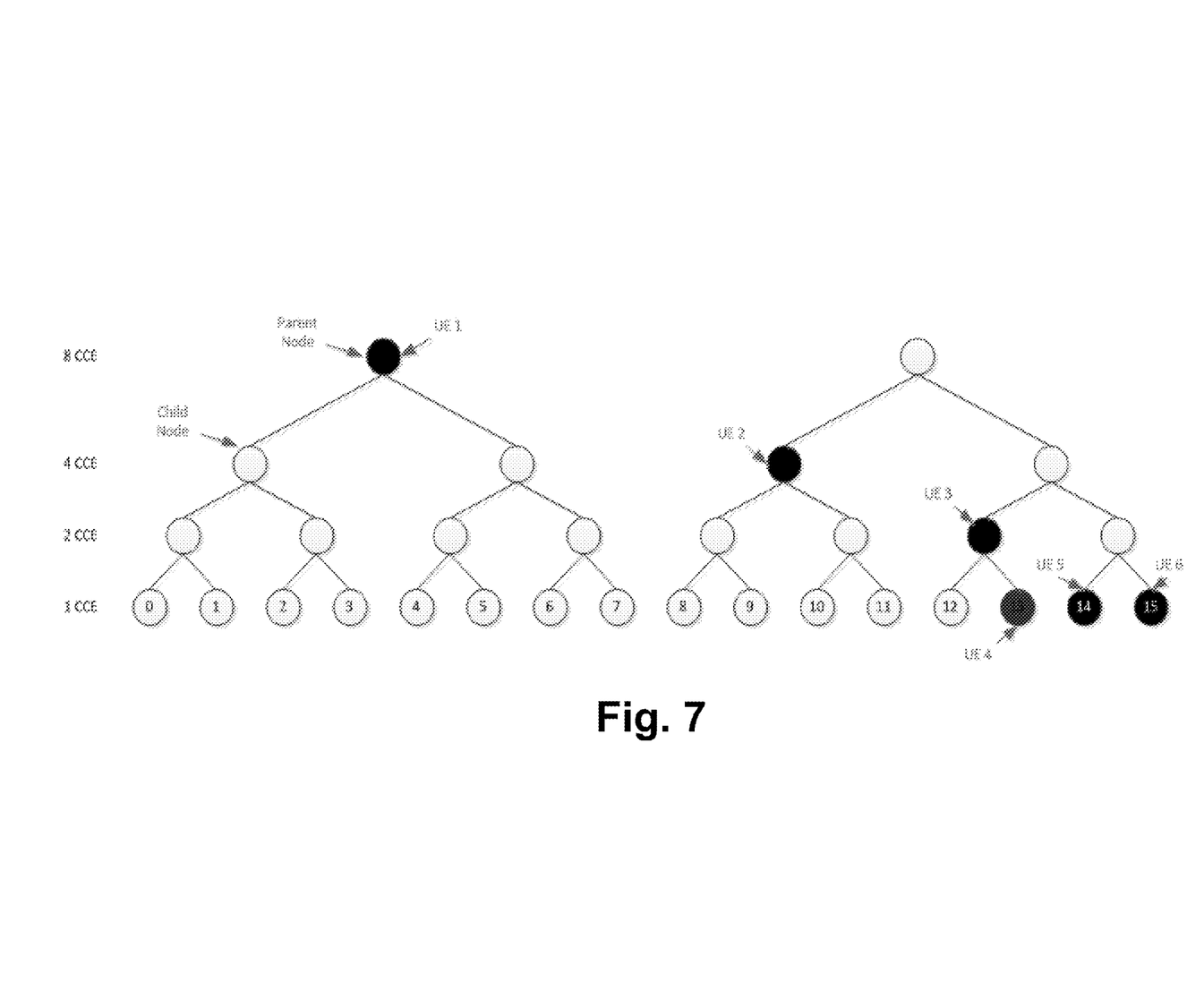
FIG. 7 is a depiction of representative tree-like data structures for storing control signaling allocation data in accordance with an example implementation.

Programmatically, the processor may perform the initial allocation of CCEs by establishing within data storage 26 one or more tree-like data structures, each representing an initial allocation of eight CCEs. The number of these tree-like data structures that the processing unit establishes within data storage may thus depend on the frequency bandwidth and particularly the number of CCEs that can theoretically be allocated for use in the time segment at issue (such as in a given symbol row). FIG. 7 illustrates this, for an initial allocation of a total of 16 CCEs among six UEs, in the form of two tree-like data structures.

As shown in FIG. 7, each tree-like data structure has four levels, designated from bottom to top as 1 CCE, 2 CCE, 4 CCE, and 8 CCE. The bottom level (1 CCE) of each tree has eight nodes, each representing one of eight available CCEs. The next level up (2 CCE) has four nodes, each representing a combination of two of the CCEs from the bottom level. The next level up (4 CCE) then has two nodes, each representing a combination of two the nodes in the 2 CCE row, and thus representing a combination of four of the CCEs from the bottom level. And finally, the top level (8 CCE) has one node, representing a combination of the two nodes in the 4 CCE row, and thus representing a combination of all eight of the CCEs from the bottom level.

Each level of such a tree-like data structure may also be referenced in data storage of the base station by a respective power of 2 describing how many CCEs each node in the level represents, and indicating its relationship with another level of the structure. For instance, a given level of the structure may be referred to as level $2^n$, the next level down in the tree structure may then be referred to as level $2^{n-1}$, and the next level up in the tree structure may be referred to as level $2^{n+1}$. As a specific example, if n is 3, the top level (8 CCE) could be referred to as $2^n$, the next level down (4 CCE) could be referred to as $2^{n-1}$, the next level down (2 CCE) could be referred to as $2^{n-2}$, and the bottom level could be referred to as $2^{n-3}$. And as another example, the second row from the top (4 CCE) could be referred to as $2^n$, the next level down (2 CCE) could be referred to as $2^{n-1}$, the bottom level down (1 CCE) could be referred to as $2^{n-2}$, and the top level could be referred to as $2^{n+1}$.

With these tree-like data structures, the processing unit can assign UEs to particular tree nodes to represent allocation of CCEs among the UEs, by storing UE identifiers in data storage locations representing particular tree nodes for instance.

The arrangement of FIG. 7 shows an initial heuristic allocation among UEs 1-6. In particular, as shown, UE 1 is assigned to the top node of the left-hand tree, representing allocation of CCEs 0-7 to UE 1. Further, UE 2 is assigned to a node in the 4 CCE level of the right-hand tree, representing an allocation of CCEs 8-11 to UE 2. Still further, UE 3 is assigned to a node in the 2 CCE level of the right-hand tree, representing allocation of CCEs 12-13 to UE 3. And finally, UEs 4, 5, and 6 are assigned respectively to nodes 13, 14, and 15 in the 1 CCE level of the right-hand tree, representing allocation of CCEs 13, 14, and 15 respectively to those UEs.

As can be seen from this figure, this initial heuristic allocation of CCEs is imperfect, as CCE 13 is allocated individually to UE 4 and is also allocated, together with CCE 12, to UE 3. It would therefore be desirable to change this initial allocation, such as (i) to allocate CCE 12 to UE 3 instead of allocating both CCEs 12 and 13 to UE 3 or (ii) to allocate an single CCE from another tree to UE 4 instead of allocating CCE 13 to UE 4. The present method may help to accomplish this and to otherwise modify CCE allocations.

Figure 8:
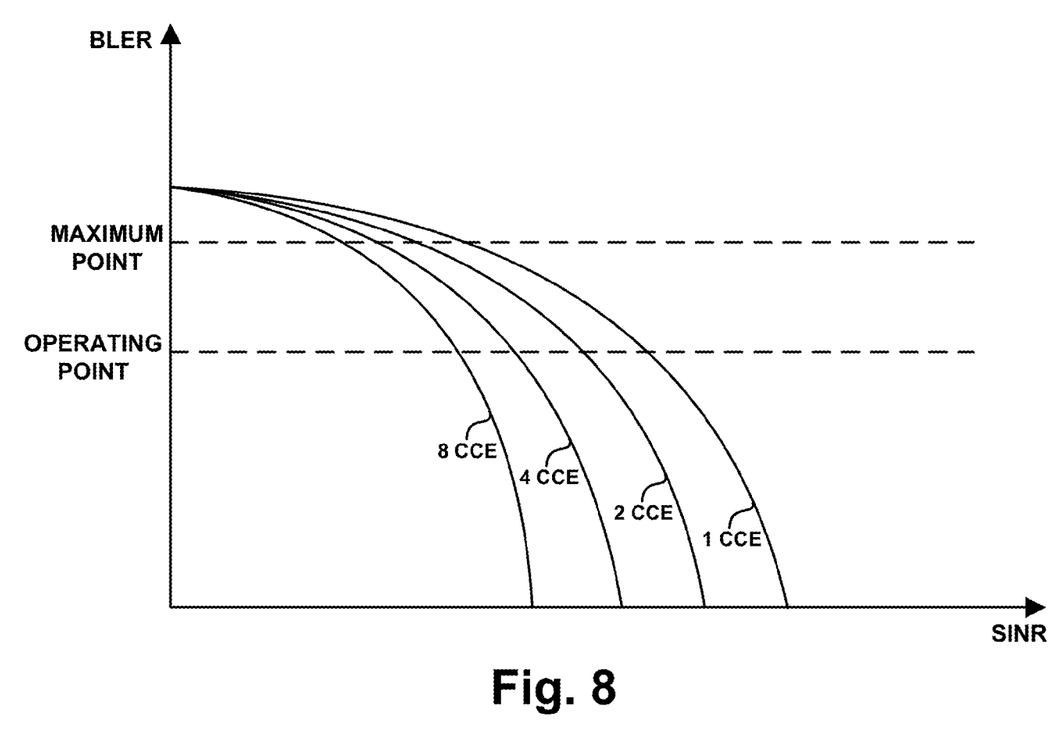
FIG. 8 is a plot of CCE allocation as a function of predicted error rate and signal-to-noise ratio, for use within an example implementation.

Assigning various UEs to nodes of the tree-like data structures as depicted in FIG. 7 establishes an initial allocation of CCEs. To determine an initial allocation of CCE transmission power for each UE as well, the processing unit may then apply a set of data that plots different quantities of CCEs as a function of block error rate and signal-to-noise ratio (or, more directly, transmission power). FIG. 8 depicts a plot of such data, which may be established empirically and stored in data storage 26 for reference by the processing unit.

In FIG. 8, the x-axis represents signal-to-noise ratio (SINR), which may be largely proportional to transmission power, and the y-axis represents block error rate (BLER). Further, the plot shows dashed lines representing two particular BLER levels, an operating point and a maximum point. The operating point may represent a predicted measure of BER for the UE at issue, possibly based on (e.g., the same as) an actual BLER seen for the UE, and/or based on one or more other factors. The maximum point may then represent a maximum tolerable error rate, which may be a matter of engineering design choice.

The plot of FIG. 8 then shows four waterfall curves (which may be stored algorithmically by the base station), each representing one of the possible allocations of CCEs, namely one curve representing 8 CCE, another curve representing 4 CCE, another curve representing 2 CCE, and another curve representing 1 CCE. Consistent with the discussion above, these curves show that, at the operating point, the base station would need more transmission power to transmit control signaling with fewer CCEs. Further, these curves show that if the transmission power remains constant and the number of CCEs changes, the BLER would change. In particular, if the number of CCEs decreases without increasing the transmission power, the BLER would rise, and if the number of CCEs increases without decreasing the transmission power, the BLER would fall.

Given the initial CCE allocations for each UE and given the operating point respectively for each UE, the processing unit may refer to these waterfall curves to determine what the initial allocation of transmission power would be respectively for each UE. Optimally, the total initial allocation of transmission power for transmission of control signaling to the various UEs would be less than the base station's maximum transmission power, thus leaving some power headroom. Otherwise, the base station may need to iteratively adjust the initial allocation to reduce the total initial allocation.

Continuing with reference to FIG. 6, having initially allocated a first number of CCEs at a first transmission power level for transmission of control signaling to a given UE with a predicted error rate within tolerance, the processing unit may next carry out a modification process in an effort to optimize that allocation, particularly where necessary to correct imperfections as noted above, but generally in an effort to provide more efficient allocation given available resources. This modification process may take various forms.

In accordance with an example modification process, as shown next at block 62, the processing unit may begin by making a first determination of whether the base station has sufficient transmission power headroom to engage in the transmission with a second number of CCEs less than the first number of CCEs and at an associated second transmission power level higher than the first transmission power level, while keeping the predicted error rate unchanged (or otherwise within error tolerance).

Figure 9:
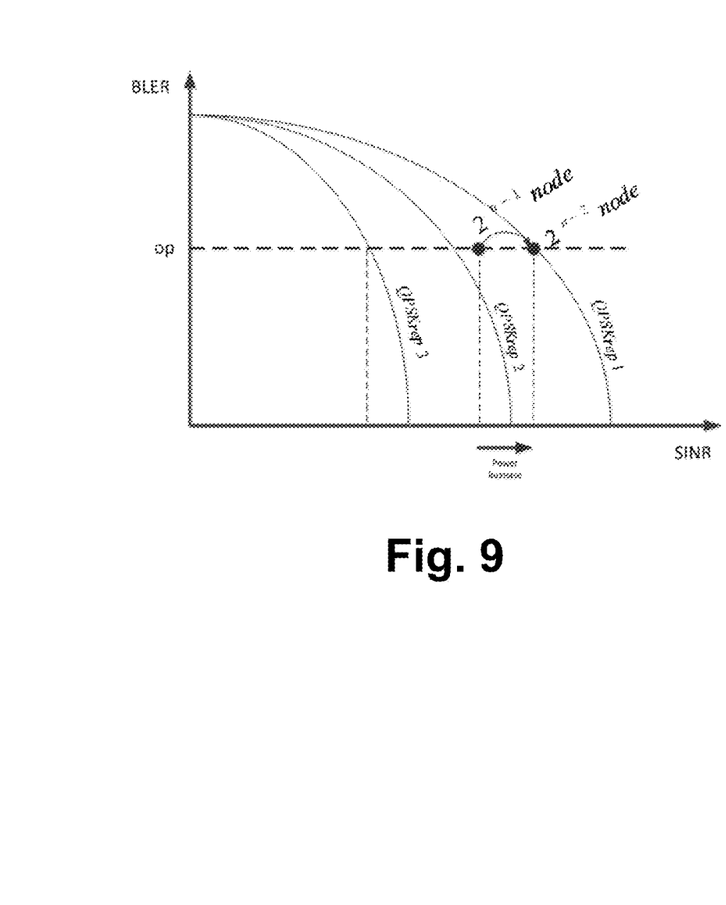
FIG. 9 is a plot of CCE allocation depicting a change in transmission power that may result from a decrease in number of allocated CCEs.

The processing unit may make this first determination by referring to its stored data as depicted in FIG. 8, to determine what increase in transmission power would correspond with the reduction in number of CCEs, and then determining if the base station has at least that much additional available power. FIG. 9 shows an example of the issue addressed by this analysis. As shown in FIG. 9, assuming that the current allocation to the UE is represented by a node in level $2^{n-1}$ of the tree-like data structure as discussed above, the question is whether the base station has sufficient power headroom to accommodate an allocation in level $2^{n-2}$ instead. For instance, if the processing unit had initially allocated eight CCEs to the UE, at issue may be whether the base station has sufficient power headroom to instead allocate four CCEs to the UE. Or if the processing unit had initially allocated four CCEs to the UE, at issue may be whether the base station has sufficient power headroom to instead allocate two CCEs to the UE.

As shown in FIG. 9, consistent with the discussion above, moving to a lower level of the tree-like data structure while keeping the predicted block error rate unchanged would require additional transmission power (higher signal to noise ratio), as represented by the "power increase" arrow in the figure. Considering other existing power allocations and the maximum transmission power of the base station, the processing unit may then determine whether the base station has at least that indicated additional power available.

If the processing unit thereby determines that the base station has sufficient transmission power headroom to engage in the transmission with the second number of CCEs and at the second transmission power level, while keeping the predicted error rate unchanged, then, at block 64, the processing unit may responsively change the allocation to be that second number CCEs at that second transmission power level.

On the other hand, if the processing unit thereby determines that the base station does not have sufficient transmission power headroom to engage in the transmission with the second number of CCEs and at the second transmission power level, while keeping the predicted error rate unchanged, then, at block 66, the processing unit may then make a second determination of whether transmission of control signaling to the UE with the second number of CCEs but at the first transmission power level would have a predicted error rate within the defined error tolerance.

Figure 10:
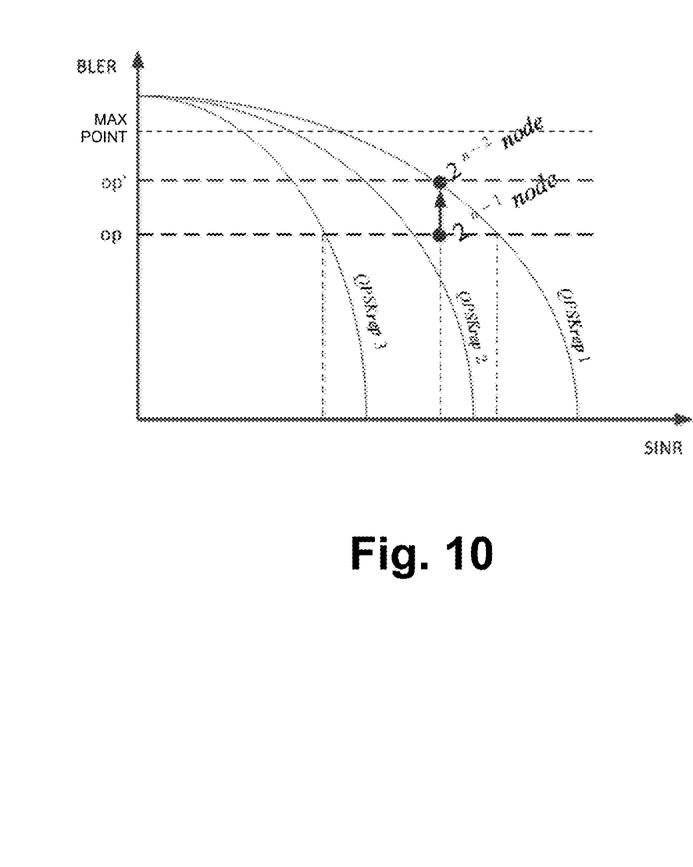
FIG. 10 is a plot of CCE allocation depicting a change in predicted error rate that may result from a change in CCE allocation.

The processing unit may make this second determination as well by referring to its stored data as depicted in FIG. 8, in this case to determine what the error rate would correspond with reduction to the second number of CCEs if transmission power is kept at the first transmission power level, and to then determine if that projected error rate would be within tolerance. FIG. 10 shows an example of the issue addressed by this analysis. As shown in FIG. 10, assuming that the processing unit has currently allocated $2^{n-1}$ CCEs to the UE at a predicted operating point (op), the question is whether the resulting operating point (op') would be less than the maximum operating point if the processing unit instead allocates $2^{n-2}$ CCEs to the UE but keeps the transmission power unchanged.

(In an alternative implementation, note that the second determination may instead be whether the predicted error rate would remain within tolerance if the allocation is changed to the second number of CCEs and the transmission power is increased from the first transmission power level but not all the way to the second transmission power level that the plot would indicate for the change. That is, at issue would be whether a partial adjustment could be made in transmission power while still maintaining predicted error rate within tolerance.)

If this second determination is affirmative, then, at block 68, the processing unit may responsively change the allocation to be the second number of CCEs at the first transmission power level. On the other hand, if this second determination is negative, then, at block 70, the processing unit may not responsively change the allocation to be the second number of CCEs at the first transmission power level.

Figure 11:
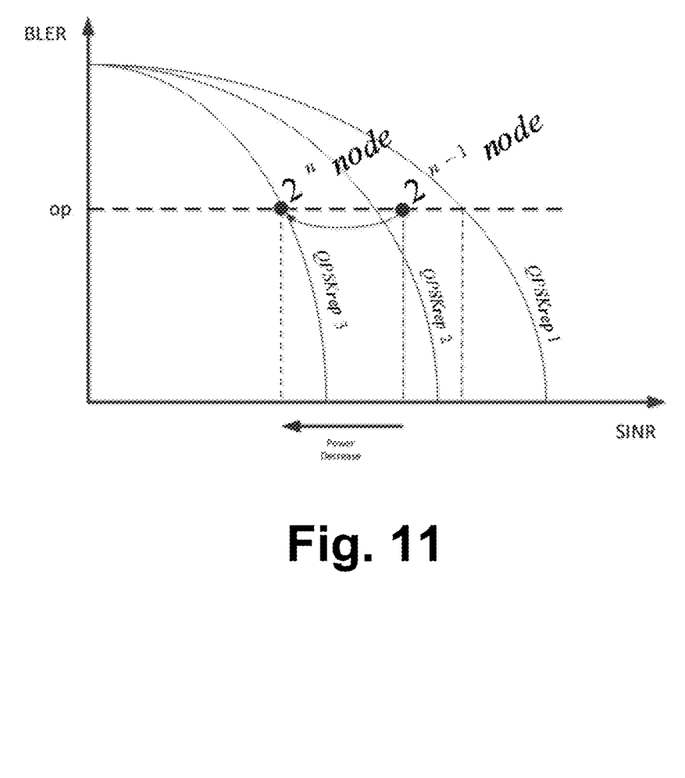
FIG. 11 is a plot of CCE allocation depicting a change in transmission power that may result from an increase in number of allocated CCEs.

If the processing unit does not responsively change the allocation to be the second number of CCEs at the first transmission level, the processing unit may instead maintain the initial allocation unchanged. Alternatively, the processing unit may instead change the allocation to be a third number of CCEs greater than the first number of CCEs and at an associated reduced transmission power level lower than the first transmission power level. For instance, as shown in FIG. 11, assuming that the processing unit has currently allocated $2^{n-1}$ CCEs to the UE at a particular power level and a particular operating point, the processing unit may instead allocate $2^{n}$ CCEs to the UE at a reduced transmission power level and the same operating point.

Further, throughout this modification process, the processing unit may also take into account the modulation coding scheme that would be used for transmission with various numbers of CCEs. For instance, the processing unit may have reference data or program logic that indicates particular modulation coding schemes that the processing unit would use respectively with each of the numbers of CCEs, and thus that associates the modulation coding schemes with the waterfall curves as shown in FIG. 8—essentially plotting modulation coding scheme as a function of transmission power and predicted error rate. Such data or logic may indicate, for instance, that a transmission with the first number of CCEs would use a first modulation coding scheme, such as QPSK with a first extent of repetition (e.g., QPSKrep2), and a transmission with the second number of CCEs would use a second modulation coding scheme, such as QPSK with a second extent of repetition less than the first extent of repetition (e.g., QPSKrep1).

In making the first determination at block 62, the processing unit may then take this modulation coding scheme into account. For instance, the processing unit may determine from the plot that changing the allocation to be the second number of CCEs instead of the first number of CCEs would correspond with a change from use of the first modulation coding scheme to use of the second modulation coding scheme. In turn, the processing unit may then determine that the change from use of the first modulation coding scheme to the second modulation coding scheme, without a change in predicted error rate of the transmission, would correspond with an increase in transmission power from the first transmission power level to the second transmission power level. As discussed above, the processing unit may then determine whether the base station has sufficient power headroom to cover the increase in transmission power.

Likewise, in making the second determination at block 66, the processing unit may also take this modulation coding scheme factor into account. For instance, the processing unit may determine from the plot that changing the allocation to be the second number of CCEs would correspond with a change from use of the first modulation coding scheme to use of the second modulation coding scheme. In turn, the processing unit may then determine that using the second modulation coding scheme but at the first transmission power level would correspond with a predicted error rate of the transmission. And the processing unit may then determine whether that predicted error rate is within the defined error tolerance.

Furthermore, the processing unit may also take into account modulation coding scheme in the scenario where the process described above results in the processing unit changing the allocation to be the third number of CCEs greater than the first number of CCEs and at an associated reduced transmission power lower than the first transmission power level. In that scenario, for instance, the processor may determine from the plot that the transmission using the first number of CCEs would use a first modulation coding scheme and would have a first predicted error rate. Further, the processor may determine from the plot that the transmission using the third number of CCEs would use a third modulation coding scheme, and that the transmission using the third number of CCEs but maintaining the first predicted error rate would use a fourth transmission power level. In that case, the reduced transmission power level may be not as low as the fourth transmission power level indicated by the plot. That is, the processing unit would change the allocation to be the third number of CCEs but would not decrease the transmission power level as much as the plot would indicate would be done if the predicted error rate would remain unchanged.

Still further, in practice, the processing unit may condition carrying out the modification process described above on first determining that the UE at issue has an actual block error rate lower than a defined target error rate. Alternatively, the processing unit may carry out the modification process without regard to evaluation of the actual error rate of the UE.

Continuing with reference to FIG. 6, once the processing unit has completed the modification process, the processing unit may then cause the base station to engage in the transmission in accordance with the allocation (as modified, if at all, by the modification process). For instance, through control of the base station, the processing unit may cause the base station to transmit an allocated number of CCEs to the UE at an allocated transmission power level.

Exemplary embodiments have been described above. It should be understood, however, that variations from these embodiments are possible, while remaining within the true spirit and scope of the invention.

We claim:

1. A method for managing air interface control channel resources for transmission of control signaling from a base station to a user device, the method comprising, in order, the following functions:
    (a) establishing for the transmission an initial resource allocation comprising a first number of control channel elements and an associated first transmission power level, for the transmission to have a predicted error rate within a defined error tolerance;
    (b) engaging in a modification process comprising:
        (i) making a first determination of whether the base station has sufficient transmission power headroom to engage in the transmission with a second number of control channel elements fewer than the first number of control channel elements and at an associated second transmission power level higher than the first transmission power level while keeping the predicted error rate unchanged,
        (ii) if the first determination is affirmative, then changing the allocation to comprise the second number of control channel elements and the second transmission power level,
        (iii) if the first determination is negative, then making a second determination of whether the transmission with the second number of control channel elements but at the first transmission power level would have a predicted error rate within the defined error tolerance,
        (iv) if the second determination is affirmative, then changing the allocation to comprise the second number of control channel elements at the first transmission power level, and
        (v) if the second determination is negative, then not changing the allocation to comprise the second number of control channel elements; and
    (c) engaging in the transmission in accordance with the allocation.

2. The method of claim 1, wherein the transmission with the first number of control channel elements uses an associated first modulation coding scheme, and the transmission with the second number of control channel elements uses a second modulation coding scheme.

3. The method of claim 2, wherein the first modulation coding scheme comprises quadrature phase-shift keying (QPSK) using a first extent of repetition, and wherein the second modulation coding scheme comprises QPSK using a second extent of repetition, the second extent being less than the first extent.

4. The method of claim 2, wherein making the first determination comprises:
    determining that changing the allocation to be the fewer number of control channel elements instead of the first number of control channel elements would correspond with a change from use of the first modulation coding scheme to use of the second modulation coding scheme;
    determining that the change from use of the first modulation coding scheme to the second modulation coding scheme, without a change in predicted error rate of the transmission, would correspond with an increase in transmission power from the first transmission power level to the second transmission power level; and
    determining whether the base station has sufficient power headroom to cover the increase in transmission power.

5. The method of claim 4, further comprising maintaining in data storage of the base station a set of data that plots each of various modulation coding schemes as a function of transmission power level and predicted error rate,
    wherein determining that the change from use of the first modulation coding scheme to the second modulation coding scheme, without a change in predicted error rate of the transmission, would correspond with the increase in transmission power from the first transmission power level to the second transmission power level is done by reference to the data.

6. The method of claim 2, wherein making the second determination comprises:
    determining that changing the allocation to be the second number of control channel elements instead of the first number of control channel elements would correspond with a change from use of the first modulation coding scheme to use of the second modulation coding scheme;

determining that the transmission using the second modulation coding scheme but at the first transmission power level would correspond with a particular predicted error rate of the transmission; and determining whether the particular predicted error rate is within the defined error tolerance.

7. The method of claim 6, further comprising maintaining in data storage of the base station a set of data that plots each of various modulation coding schemes as a function of transmission power level and predicted error rate, wherein determining that the transmission using the second modulation coding scheme but at the first transmission power level would correspond with a particular predicted error rate of the transmission is done by reference to the data.

8. The method of claim 1, wherein not changing the allocation to be the second number of control channel elements comprises maintaining the initial allocation unchanged.

9. The method of claim 1, wherein not changing the allocation to be the second number of control channel elements comprises:

changing the allocation to be a third number of control channel elements greater than the first number of control channel elements and at an associated reduced transmission power level lower than the first transmission power level.

10. The method of claim 9, wherein the transmission with the first number of control channel elements uses an associated first modulation coding scheme, and the transmission with the third number of control channel elements uses a third modulation coding scheme.

11. The method of claim 10, further comprising maintaining in data storage of the base station a set of data that plots each of various modulation coding schemes as a function of transmission power level and predicted error rate, wherein the data indicates that the transmission using the first modulation coding scheme at the first transmission power level has a first predicted error rate, wherein the data indicates that the transmission using the third modulation coding scheme but maintaining the first predicted error rate would be at a fourth transmission power level, and wherein the reduced transmission power level is not as low as the fourth transmission power level indicated by the data.

12. The method of claim 1, wherein the base station is a Long Term Evolution (LTE) eNodeB, and the control channel elements are elements of an LTE physical downlink control channel.

13. The method of claim 1, further comprising:

conditioning engaging in the modification process on a determination that an actual error rate in transmission of control signaling to the user device is less than a target error rate.

14. A base station for use in a wireless communication system, the base station comprising:

an antenna structure for radiating to define an air interface;
a power-amplifier;
a processing unit;
data storage; and
resource-allocation logic stored in the data storage and executable by the processing unit to allocate air interface signaling capacity for transmission of control signaling to a user device, wherein an initial allocation of the air interface signaling capacity for the transmission comprises a first number of control channel elements and an associated first transmission power level, for the transmission to have a predicted error rate within a defined error tolerance, and wherein the resource-allocation logic, when executed by the processing unit, causes the processing unit to carry out the following functions, in order:

(i) making a first determination of whether the base station has sufficient transmission power headroom to engage in the transmission with a second number of control channel elements fewer than the first number of control channel elements and at an associated second transmission power level higher than the first transmission power level while keeping the predicted error rate unchanged, (ii) if the first determination is affirmative, then changing the allocation to comprise the second number of control channel elements and the second transmission power level, (iii) if the first determination is negative, then making a second determination of whether the transmission with the second number of control channel elements but at a transmission power level less than the second transmission power level would have a predicted error rate within the defined error tolerance, (iv) if the second determination is affirmative, then changing the allocation to comprise the second number of control channel elements, (v) if the second determination is negative, then not changing the allocation to comprise the second number of control channel elements, and (vi) allocating the air interface signaling capacity in accordance with the allocation.

15. The base station of claim 14, wherein the transmission with the first number of control channel elements uses an associated first modulation coding scheme, and the transmission with the second number of control channel elements uses a second modulation coding scheme.

16. The base station of claim 15, wherein making the first determination comprises:

determining that changing the allocation to be the fewer number of control channel elements instead of the first number of control channel elements would correspond with a change from use of the first modulation coding scheme to use of the second modulation coding scheme;

determining that the change from use of the first modulation coding scheme to the second modulation coding scheme, without a change in predicted error rate of the transmission, would correspond with an increase in transmission power from the first transmission power level to the second transmission power level; and determining whether the base station has sufficient power headroom to cover the increase in transmission power.

17. The base station of claim 16, further comprising:

data stored in the data storage, plotting each of various modulation coding schemes as a function of transmission power level and predicted error rate, wherein determining that the change from use of the first modulation coding scheme to the second modulation coding scheme, without a change in predicted error rate of the transmission, would correspond with the increase in transmission power from the first transmission power level to the second transmission power level is done by reference to the data.

18. The base station of claim 14, wherein the base station is a Long Term Evolution (LTE) eNodeB, and the control channel elements are elements of an LTE physical downlink control channel.

19. A non-transitory computer readable medium having stored thereon instructions executable by a processing unit to cause a base station to carry out the following functions, in order, after initially allocating to a user device a first number of control channel elements at an associated first transmission power level, for transmission of the control channel elements to have a predicted error rate within a defined error tolerance:
 making a first determination of whether the base station has sufficient transmission power headroom to engage in the transmission with a second number of control channel elements fewer than the first number of control channel elements and at an associated second transmission power level higher than the first transmission power level while keeping the predicted error rate unchanged;
 if the first determination is affirmative, then changing the allocation to comprise the second number of control channel elements and the second transmission power level;
 if the first determination is negative, then making a second determination of whether the transmission with the second number of control channel elements but at a transmission power level less than the second transmission power level would have a predicted error rate within the defined error tolerance;
 if the second determination is affirmative, then changing the allocation to comprise the second number of control channel elements;
 if the second determination is negative, then not changing the allocation to comprise the second number of control channel elements; and
 allocating signaling capacity of an air interface in accordance with the allocation.

20. The non-transitory computer readable medium of claim 19, wherein the air interface is a Long Term Evolution (LTE) air interface, wherein the base station is an LTE eNodeB, and wherein the control channel elements are elements of an LTE physical downlink control channel.

* * * * *